(12) United States Patent
Usinger et al.

(10) Patent No.: US 12,085,177 B2
(45) Date of Patent: Sep. 10, 2024

(54) VALVE ARRANGEMENT

(71) Applicant: Festo SE & Co. KG, Esslingen (DE)

(72) Inventors: Eduard Usinger, Aichwald (DE); Bastian Behnke, Wangen (DE)

(73) Assignee: Festo SE & Co. KG, Esslingen (DE)

( * ) Notice: Subject to any disclaimer, the term of this patent is extended or adjusted under 35 U.S.C. 154(b) by 199 days.

(21) Appl. No.: 17/592,676

(22) Filed: Feb. 4, 2022

(65) Prior Publication Data
US 2022/0252167 A1    Aug. 11, 2022

(30) Foreign Application Priority Data

Feb. 9, 2021 (DE) .......................... 102021201205.1

(51) Int. Cl.
*F16K 11/24* (2006.01)
*F15B 20/00* (2006.01)
*F16P 3/22* (2006.01)

(52) U.S. Cl.
CPC ............ *F16K 11/24* (2013.01); *F15B 20/001* (2013.01); *F15B 20/008* (2013.01); *F15B 2211/875* (2013.01); *F16P 3/22* (2013.01)

(58) Field of Classification Search
CPC .......... G05D 16/2024; G05D 16/2022; G05D 16/2033; F15B 13/043; F15B 2211/3052; F15B 2211/3565; F15B 2211/324; F15B 2211/327; F15B 2211/329; F15B 2211/355; F15B 2211/6355; F15B 2211/67; F15B 2211/7052; F15B 2211/8636; F15B 2211/8752; F15B 2211/8757; F15B 20/008; F15B 20/001; F15B 2013/041; F15B 2211/8855; F16K 11/24; F16P 3/22
See application file for complete search history.

(56) References Cited

FOREIGN PATENT DOCUMENTS

DE    4221756 A1    1/1994
EP    2545286 B1    4/2017

OTHER PUBLICATIONS

Translation of DE 4221756 (Year: 2023).*

* cited by examiner

*Primary Examiner* — Kelsey E Cary
(74) *Attorney, Agent, or Firm* — Hoffmann & Baron, LLP

(57) ABSTRACT

A valve arrangement has two main valves which are each preloaded by a spring device into a first switching position, and which can each be switched into a second switching position by means of an assigned pilot valve. The pilot medium required for switching is provided with a pilot pressure at a pilot connection of each pilot valve. The main valves are each equipped with a working valve section each of which are fluidically connected to one another. In addition, each main valve contains a monitoring valve section. The monitoring valve sections are designed to provide the venting of at least one pilot connection when the two main valves are in different switching positions. This allows a fluid-actuated actuator to be controlled in accordance with high safety standards.

17 Claims, 5 Drawing Sheets

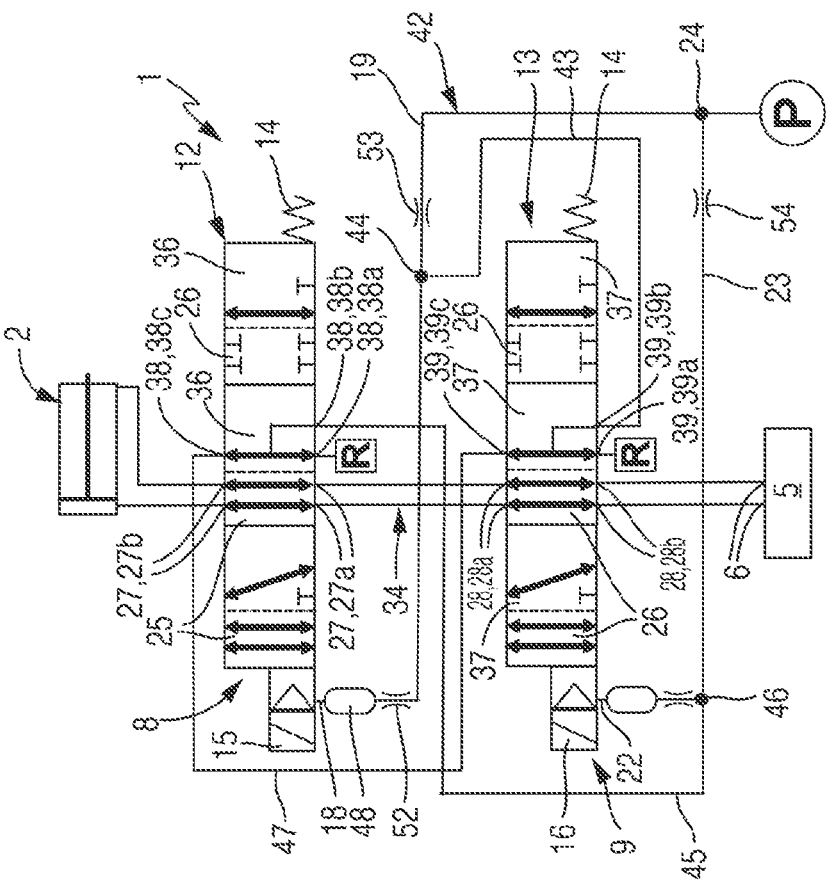
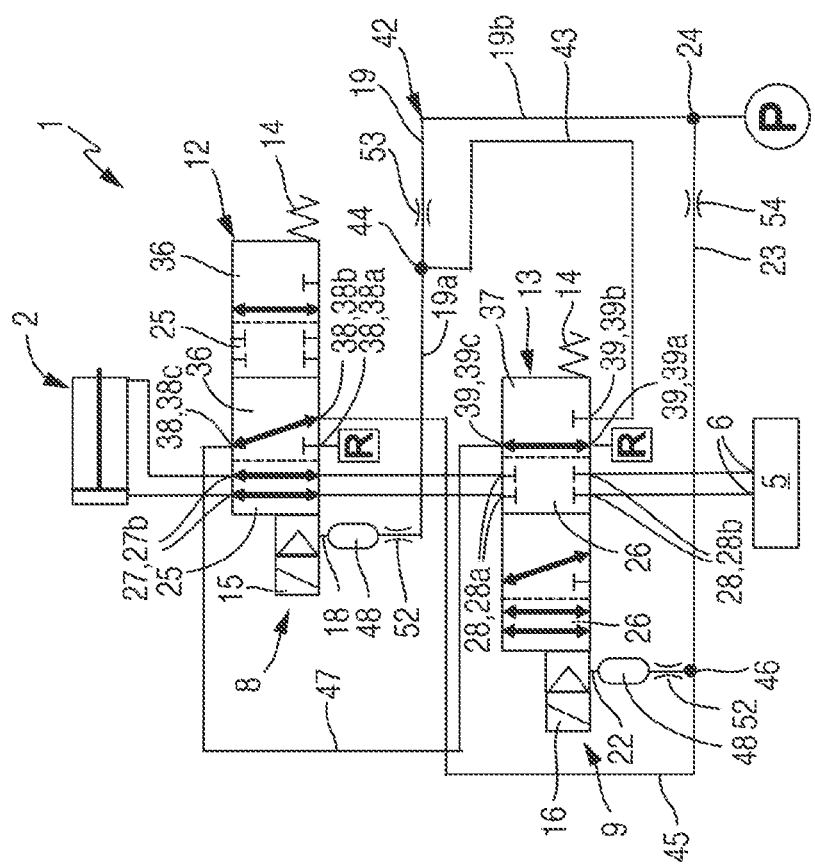
Fig. 5
Fig. 4

VALVE ARRANGEMENT

BACKGROUND OF THE INVENTION

The invention relates to a valve arrangement, having a first valve unit, which has a monostable first main valve preloaded by a spring device with a spring force into a first switching position and which has an electrically actuatable first pilot valve, by means of which the first main valve can be switched into a second switching position by means of a pilot pressure against the spring force and can be held in the second switching position, wherein the pilot pressure is provided by a pilot fluid that comes from a pilot pressure source which is connected to a first pilot connection of the first pilot valve via a first pilot channel during operation of the valve arrangement, having a second valve unit, which has a monostable second main valve preloaded by a spring device with a spring force into a first switching position and which has an electrically actuatable second pilot valve, by means of which the second main valve can be switched into a second switching position by means of a pilot pressure against the spring force and can be held in the second switching position, wherein the pilot pressure is provided by a pilot fluid that comes from a pilot pressure source which is connected to a second pilot connection of the second pilot valve via a second pilot channel during operation of the valve arrangement, wherein the first main valve has a first working valve section having a plurality of first working connections which are connected to one another and/or disconnected from one another in the first switching position of the first main valve in a first working configuration and in the second switching position of the first main valve in a second working configuration within the first main valve and wherein the second main valve has a second working valve section having a plurality of second working connections which are connected to one another and/or disconnected from one another in the first switching position of the second main valve in a first working configuration and in the second switching position of the second main valve in a second working configuration within the second main valve, wherein at least one of the first working connections and at least one of the second working connections are designed as connecting working connections, which are permanently connected to one another via a working connection channel system, and wherein at least one of the first or second working connections is an output working connection suitable for connecting a fluid-operated actuator.

A valve arrangement of this type known from EP 2 545 286 B1 contains two valve units each with an electrofluidically pilot-controlled monostable main valve. This main valve has a plurality of working connections, which are connected to one another and/or disconnected from one another in two possible switching positions of the main valve in different working configurations. The working connections of the two main valves are connected to one another by a working connection channel system in a fixed pattern. A fluid-actuated actuator can be connected to the working connection channel system, which can be operated by means of a pressure medium flowing through the main valves. The operating options of the actuator depend on which of the possible switching positions the two main valves assume.

SUMMARY OF THE INVENTION

The object of the invention is to create a valve arrangement that provides a safety function for the safe operation of a connected fluid-operated actuator without external diagnostic measures.

In order to achieve this object, in a valve arrangement according to the invention having the features mentioned at the outset is additionally provided, in that the first main valve has a first monitoring valve section fluidically separated from the first working valve section, which has a plurality of first monitoring connections, which are always connected to one another and/or disconnected from one another in the first switching position of the first main valve in a first monitoring configuration and in the second switching position of the first main valve in a second monitoring configuration deviating from the first monitoring configuration, in that the second main valve has a second monitoring valve section that is fluidically separated from the second working valve section and has a plurality of second monitoring connections that are always connected to one another and/or separated from one another in a first monitoring configuration in the first switching position of the second main valve and are always connected to one another and/or separated from one another in a second monitoring configuration that differs from the first monitoring configuration in the second switching position of the second main valve, wherein one of the first monitoring connections of the first monitoring valve section is designed as a first venting monitoring connection communicating with a pressure sink and one of the second monitoring connections of the second monitoring valve section is designed as a second venting monitoring connection communicating with a pressure sink, wherein each further first monitoring connection and each further second monitoring connection are connected to a monitoring channel system containing both the first pilot channel and the second pilot channel, and wherein the first pilot port and/or the second pilot port is connected via the monitoring channel system to the first venting monitoring connection and/or the second venting monitoring connection and is thus vented if one of the two main valves assumes its first switching position and the other of the two main valves simultaneously assumes its second switching position.

In this way, a valve arrangement is provided that offers a so-called two-channel safety function for the operation of a connected fluid-operated actuator, namely in a manner in which internal self-monitoring of the two main valves takes place without the need for an external diagnosis with sensors and evaluation. The valve arrangement is designed in such a way that the desired working function for the connected actuator is only possible if the main valves of both valve units function correctly.

In order to ensure a faultless working function, a synchronous switching of the two main valves between their two switching positions is sought. In this case, the two main valves are either in the first switching position at the same time with deactivated and therefore regularly vented pilot valves due to the assigned spring device, or they simultaneously assume the second switching position in the activated state of both pilot valves. The working valve sections of the main valves are for example designed in such a way that they prevent a fluid from penetrating into and out of a connected fluid-operated actuator if both main valves assume the first switching position by specifying a first working configuration. On the other hand, a fluid can pass through into and out of the connected actuator if both main valves simultaneously assume the second switching position and specify a second working configuration in each case. However, this working function can only be seen as optional and can also be implemented elsewhere. In any case, according to the invention, when the main valves are switched, not only a change of the working configurations predefined by the working valve sections takes place, but also a change of monitoring configurations. The monitoring configurations are the connection patterns of the monitoring connections of two monitoring valve sections, wherein each main valve has such a monitoring valve section in addition to a working valve section. When a main valve is switched to change position, both the working configuration and the monitoring configuration of the main valve in question changes synchronously. The two monitoring valve sections are connected to one another by a channel system designated as a monitoring channel system, wherein in addition one of the monitoring connections of each monitoring valve section is continuously connected to a pressure sink enabling venting and is therefore designated as a venting monitoring connection. Two pilot channels, each of which connects a pilot connection of one of the pilot valves to a pilot pressure source, belong to the monitoring channel system. As long as the two main valves switch synchronously between the two switching positions without any problems, the monitoring valve sections do not affect the overall function of the valve arrangement. However, as soon as the two main valves adopt opposite switching positions due to a fault, i.e. one main valve is in the first switching position and the other main valve is in the second switching position, the constellation of the monitoring configurations assigned therewith—which one monitoring valve section defines a first monitoring configuration and the other monitoring valve section currently defines a second monitoring configuration—triggers a safety function, which can in particular cause the two main valves to remain in their deviating switching positions. The safety function is manifested in that the pilot connection of at least one of the two pilot valves through the monitoring channel system is connected to at least one of the vent monitoring connections and is thus vented. Consequently, the assigned pilot valve can no longer be activated and the present constellation of the two main valves is frozen in a safe state which prevents undesired operation of the connected fluid-operated actuator.

For the implementation of the safety function, it is irrelevant which functionalities the two working valve sections have. The safety-relevant monitoring function is only responsible for the pilot valves. This results in minimal fluid consumption both during operation and in the event of misalignment. Since the monitoring valve section is fluidically separated from the working valve section for each main valve, a mutual influence of the fluid flows is eliminated, wherein it is ensured at the same time that a synchronous configuration change takes place on the working connections as well as on the monitoring connections when each main valve is actuated due to a mechanical coupling.

Advantageous further developments of the invention are described in the dependent claims.

Preferably, a fluid reservoir is arranged both in the first pilot channel and in the second pilot channel upstream of the respectively assigned pilot connection. The fluid reservoir prevents the assigned pilot connection from being abruptly vented in the event of unequal switching positions of the two main valves and thus tolerates a certain delay when switching over the two main valves without activating the safety function. The fluid reservoirs maintain pilot pressure on the pilot valve for a period of time even if the pilot channel is already connected to one of the purge monitoring connections. Thus, the desired safety function can be ensured independently of certain switch-over delays, which prevents undesired activation of the safety function. For example, the fluid reservoirs can be designed such that a delay time of up to 20 milliseconds is tolerated.

The aforementioned delay function can be optimised in that a delay throttle point causing a delayed fluid discharge is arranged in the first pilot channel as well as in the second pilot channel on the side of the fluid reservoir opposite to the assigned pilot connection, i.e. upstream in the direction of the pilot pressure source. If such a delay throttle point is used, the tolerance behaviour can also be realised with relatively small volumes of fluid, which enables a compact configuration of the valve arrangement. The functionality of the monitoring valve sections is in principle irrelevant as long as the desired effect occurs. It is particularly advantageous if each monitoring valve section has a 3/2 valve function.

The delay throttle points are realised, for example, by means of orifices or by means of adjustable throttle screws or by means of throttle valves.

The 3/2 valve function is expediently implemented in both monitoring valve sections such that the first monitoring valve section has three first monitoring connections and the second monitoring valve section has three second monitoring connections, wherein the first monitoring valve section comprises, in addition to the first venting monitoring connection, a first feed monitoring connection and a connected connection monitoring connection and wherein the second monitoring valve section comprises, apart from the second venting monitoring connection, a second feed monitoring connection and a second connection monitoring connection. The first feed monitoring connection is—in particular via a first branch channel of the monitoring channel system—connected to the second pilot control channel, while the second feed monitoring connection—in particular via a second branch channel of the monitoring channel system—is connected to a first pilot control channel. Furthermore, a preferably continuous fluid connection between the first connection monitoring connection and the second connection monitoring connection is to implemented by means of a monitoring connection channel.

It is favourable if the first monitoring valve section and the second monitoring valve section are designed such that the first monitoring valve section belonging to the first main valve establishes a fluid connection between the first connection monitoring connection and the first venting monitoring connection in the first monitoring configuration and a fluid connection between the first connection monitoring connection and the first feed monitoring connection in the second monitoring configuration, wherein the second monitoring valve section belonging to the second main valve establishes a fluid connection between the connected connection monitoring connection and the second venting monitoring connection in the first monitoring configuration and in the second monitoring configuration, establishes a fluid connection between the second connection monitoring connection and the second feed monitoring connection. The third monitoring connection not currently involved in the respective fluid connection is expediently separated from said fluid connection.

It is advantageous if the second feed monitoring connection is connected to the first pilot channel via a first branch channel of the monitoring channel system at a first branch. In this context, it is also advantageous if the first feed monitoring connection is connected to the second pilot channel via a second branch of the monitoring channel system at a second branch. Each branch is preferably located at a distance both to the assigned pilot connection and to a pilot feed connection to which the pilot pressure source is connected during operation of the valve arrangement.

As indicated above, the monitoring channel system preferably has a pilot feed connection connected to the pilot pressure source during operation of the valve arrangement. Both the first pilot channel and the second pilot channel are expediently connected to this pilot feed connection. Expediently, a first input throttle point is located in the course of the first pilot channel between the pilot pressure source and the first branch, while a second input throttle point is arranged in the course of the second pilot channel between the pilot pressure source and the second branch. The input throttle point prevents inappropriate air consumption if the assigned pilot connection is vented when the safety function is activated.

The input throttle points are realised, for example, by means of orifices or by means of adjustable throttle screws or by means of throttle valves.

Preferably, each input throttle point has a greater flow resistance than a channel line, which extends in the vented state of a pilot connection between this pilot control connection and a venting monitoring connection and which includes the branch channel connected to the assigned branch. This ensures that the fluid flow rate in the case of safety-relevant venting is greater than the flow of the fluid flowing at the same time from the pilot pressure source and thus the desired pressure reduction can occur at the pilot connection.

The flow resistances of the delay throttle points present in connection with a fluid reservoir are expediently less than the flow resistances of the input throttle points. However, any individual design is possible, for example with an inverse size relationship or with flow resistances that are the same with one another.

When switching between the first switching position and the second switching position, each main valve passes through an intermediate position, which is in particular a centre position. This is a temporary intermediate position during normal operation of the main valve. The monitoring valve sections are preferably designed with a negative overlap in terms of their internal valve structures. In this case, in the temporary intermediate position or middle position, an intermediate configuration of the monitoring connections of a respective monitoring valve section expediently occurs which deviates from the first monitoring configuration and from the second monitoring configuration, in which all monitoring connections are fluidically connected to one another. This negative overlap can be present in only one of the two main valves, but is expediently realised both in the first main valve and in the second main valve.

The aforementioned constellation has the effect, for example, that both main valves are switched back to the first switching position by the spring devices if the pilot pressure medium falls away when switching from the first switching position to the second switching position due to a fault.

Furthermore, this constellation means that when switching from the first switching position to the second switching position, the main valve correctly switched to the second switching position is immediately moved back to the first switching position by the assigned spring device if the other main valve remains stuck in the intermediate position or middle position.

Similarly, in the case of the aforementioned constellation of safety aspects, it can also be stated that a main valve which is correctly switched over from the second switching position to the first switching position can no longer be switched over to the second switching position if the other main valve remains stuck in the intermediate position or centre position when switching back. In at least one and preferably in each of the two main valves, the working valve section and the monitoring valve section are preferably coordinated with one another such that in the above-mentioned intermediate position, the first working configuration of the working connections is present, just as in the first switching position.

In order to ensure an always synchronous switching of the working configurations and the monitoring configurations of the same main valve, each main valve preferably has a valve slide that can only be moved in a uniformly synchronous manner relative to a main valve housing of the respective main valve, which is responsible for both the specification of the working configurations and the specification of the monitoring configurations of the respective main valve. In other words, the working valve section and the monitoring valve section of each main valve is expediently assigned to one and the same valve slide together, which only has two different valve slide sections, of which one is a working valve slide section belonging to the working valve section and the other is a monitoring valve slide section belonging to the monitoring valve section. These two valve slide sections are mechanically forcibly coupled so that they can only be moved in the same way at all times. The easiest way to achieve this is by means of a one-piece valve slide, although it is also possible to use a multi-part valve slide, the components of which in each case form one of the valve slide sections and are motion-coupled to one another in any way.

Each main valve preferably has its own spring device for specifying the first switching position of the main valve. In connection with a main valve of the structure explained above, the spring device acts on the valve slide and thus simultaneously applies pressure to both the working valve slide section and the monitoring valve slide section.

In a particularly expedient embodiment of the valve arrangement, the first working valve section belonging to the first main valve has one or a plurality of working connections designed as output working connections for connecting a fluid-operated to actuator, while the second working valve section belonging to the second main valve has one or a plurality of working connections designed as input working connections for connecting a control valve device controlling the operation of the actuator. For example, there are two output working connections to which a double-acting fluid actuator, for example a pneumatic cylinder, can be connected. A working connection connected to preferably two input working connections is in particular provided to actuate the connected fluid-actuated actuator in the direction of travel if the two main valves assume the same switching position and in particular simultaneously the first switching position. The control valve device has, for example, a 5/2-way valve function or a 5/3-way valve function.

It is considered favourable if the first working valve section has four first working connections and the second working valve section has four second working connections, wherein two first working connections are designed as two output working connections and two second working connections are designed as two input working connections. Furthermore, in each case two further first working connections are designed as two first connecting working connections and two further second working connections are designed as two second connecting working connections. Each first working connection is connected to one of the two connecting working connections via a separate working connection channel of the working connection channel system. Furthermore, in the first switching position of the first main valve, the two output working connections are each connected to one of the two first connecting working connections and are disconnected from the two first connecting working connections in the second switching position of the first main valve. In addition, in the first switching position of the second main valve, the two input working connections are each connected to one of the two second connecting working connections and are disconnected from the two second connecting working connections in the second switching position of the first main valve.

In other advantageous embodiments of the valve arrangement, the working valve sections are designed to realise two 3/2 valve functions or two 5/2 valve functions in order to obtain, for example, a safety valve for safe venting or two 5/2 valves for enabling safe reversing.

BRIEF DESCRIPTION OF THE DRAWINGS

The invention is explained in more detail below with reference to the attached drawing. In the drawing:

FIGS. 3-9 show a plurality of faulty operating states of the valve arrangement from FIGS. 1 and 2, in which the safety function according to the invention is active.

DETAILED DESCRIPTION

Figure 1:
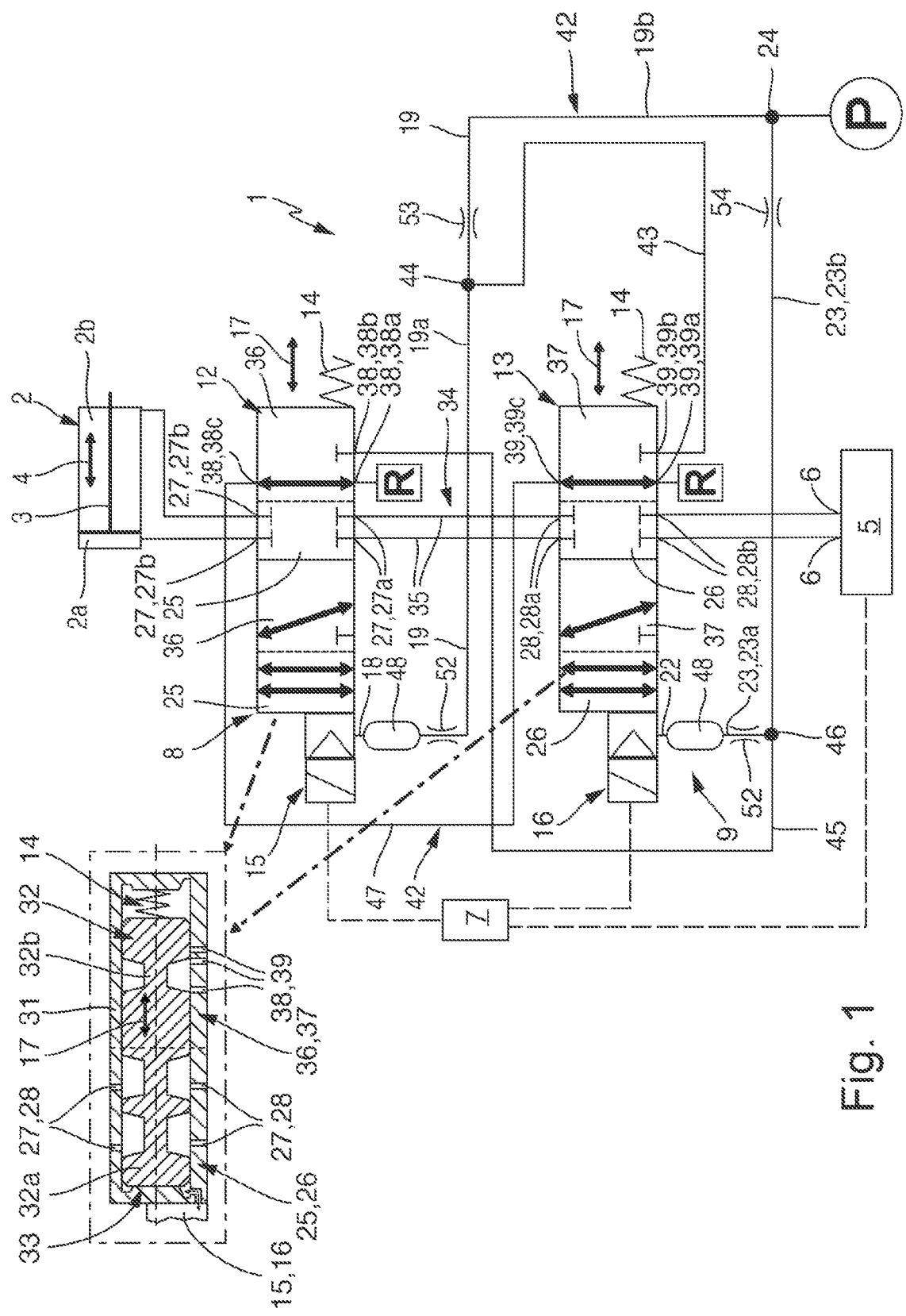
FIG. 1 shows a preferred embodiment of the valve arrangement according to the invention as a circuit diagram, wherein an operating state is shown in which the two main valves assume their first switching position with correct function and wherein a possible design configuration of the two main valves is schematically indicated in a framed image region.
Figure 2:
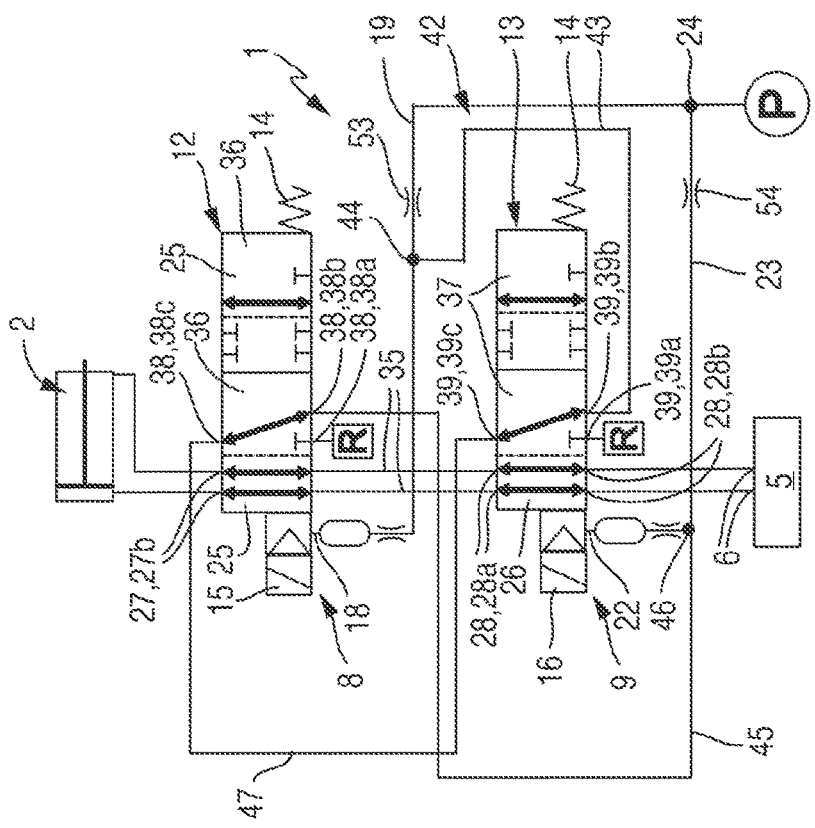
FIG. 2 shows the valve arrangement from FIG. 1 in an operating state of correct function, wherein the two main valves are switched to their second switching position.

FIGS. 1 to 9 each show a preferred embodiment of the valve arrangement 1 according to the invention in different operating states in a simplified circuit diagram. The valve arrangement 1 has two operating states with proper function, which are illustrated in FIGS. 1 and 2, wherein FIG. 1 shows a first correct operating state and FIG. 2 shows a second correct operating state.

The valve arrangement 1 can be used in connection with the fluidic actuation of a fluid-actuated actuator 2. The latter is, for example, an actuator or a rotary drive as illustrated. In particular, it is a double-acting actuator 2, which has an output part 3, which separates two drive chambers 2a, 2b from one another, which are controlled by a fluidic pressure medium also referred to in the following as the drive pressure medium, in order to cause a reciprocating output movement 4 of the output part 3.

A control valve device 5, for example, is responsible for the fluidic actuation of the actuator 2, which has two control valve outputs 6, which are connected to the two drive chambers 2a, 2b of the fluid-operated actuator 2 by interconnecting the valve arrangement 1. If the valve arrangement 1 is in the second correct operating state shown in FIG. 2, each control valve output 6 is fluidically connected to one of the drive chambers 2a, 2b such that the drive chambers 2a, 2b can be pressurised or vented by means of the control valve device 5 in order to cause the output movement 4 and to position the output part 3 in a desired output position if required. The second correct operating state of the valve arrangement 1 can therefore also be referred to as the working state. The control valve device 5 preferably has the functionality of a 5/2-way valve or a 5/3-way valve.

In order to be able to fulfil the above-mentioned actuation function, the control valve device 5 is also connected in a manner not shown to a pressure source providing the drive pressure medium and to a pressure sink. The drive pressure medium is preferably compressed air, while the pressure sink is formed by the atmosphere.

To control its mode of operation, the control valve device 5 is expediently connected to an electronic control device 7.

In the first correct operating state of the valve arrangement 1 illustrated in FIG. 1, the fluid connection between the control valve outputs 6 and the drive chambers 2a, 2b is interrupted such that an operational actuation of the actuator 2 by means of the control valve device 5 is not possible. The first correct operating state can thus also be referred to as the idle state of the valve arrangement 1.

If the valve arrangement 1 is in the idle state according to FIG. 1, an influence on the operating state of the actuator 2 by the control valve device 5 is excluded. In contrast, the actuator 2 can be fluidically actuated by means of the control valve device 5 through the valve arrangement 1 during the working state of the valve arrangement 1 shown in FIG. 2 to influence its operating state.

The valve arrangement 1 can be actively optionally set to the first or second correct operating state. In this way, from a safety perspective it is possible to influence whether the fluid-actuated actuator 2 can be actuated by means of the control valve device 5. The first correct operating state, also known as the idle state, represents a safe state in which actuation of the actuator 2 by means of the control valve device 5 is excluded. The specification of the currently desired correct operating state takes place, by way of example, by means of the already mentioned electronic control device 7, which is expediently a component of the valve arrangement 1.

The valve arrangement 1 has two valve units, hereinafter referred to as the first valve unit 8 and as the second valve unit 9. Each of these two valve units 8, 9 has a main valve, which in the case of the first valve unit 8 is designated as the first main valve 12 and in the case of the second valve unit 9 is designated as the second main valve 13.

The two main valves 12, 13 are of a monostable design and in each case are preloaded by a spring device 14 with a spring force into a first switching position shown in FIG. 1.

Each valve unit 8, 9 has an electrically actuatable pilot valve, which in the case of the first valve unit 8 is designated as the first pilot valve 15 and in the case of the second valve unit 9 is designed as the second pilot valve 16. Each pilot valve 15, 16 is able to switch the first or second main valve 12, 13 assigned thereto from the first switching position into a second switching position shown in FIG. 2 against the spring force of the spring device 14 acting on it and to hold it there. The switching force required for this delivers a pilot fluid provided by means of a pilot pressure source P and under a sufficiently high pilot pressure, which is in particular compressed air.

Each pilot valve 15, 16 can be optionally set to a deactivated or an activated state by means of the electronic control device 7. In the deactivated state, the pilot fluid is disconnected and the pilot pressure is removed from the assigned main valve 12, 13 such that the main valve 12, 13 is maintained in the first operating state by the spring force. In the activated state, the main valve 12, 13 is pressurised by the pilot pressure opposite to the spring force and can accordingly be switched to the second switching position by overcoming the spring force. The respective switching takes place as part of a switching movement 17 indicated by a double arrow. When operated correctly, each main valve 12, 13 maintains its second switching position for as long as the assigned pilot valve 15, 16 is activated.

For example, pilot valves 15, 16 are solenoid valves. Each pilot valve 15, 16 has internally preferably a 3/2 valve function, which makes it possible to optionally connect a drive surface 33 of the assigned main valve 12, 13 to the pilot pressure source P or to the atmosphere for pressure relief.

The first pilot valve 15 has a first pilot connection 18 to receive the pilot fluid under the pilot pressure, which first pilot connection is preferably continuously connected to the pilot pressure source P via a first pilot channel 19. Similarly, the second pilot valve 16 has a second pilot connection 22 for receiving the pilot medium, which second pilot connection is preferably continuously connected to a pilot pressure source P via a second pilot channel 23 that is separate with respect to the first pilot channel 19. By way of example, the valve arrangement 1 contains a pilot feed connection 24 with which the two pilot channels 19, 23 are connected and to which a jointly assigned pilot pressure source P is connected at least during the operation of the valve arrangement 1.

Each main valve 12, 13 has a working valve section, which in the case of the first main valve 12 is designated as the first working valve section 25 and in the case of the second main valve 13 is designated as the second working valve section 26. The working valve sections 25, 26 are responsible for the optional interruption or release of the fluid connection between the control valve device 5 and the actuator 2.

The first working valve section 25 has a plurality of first working connections 27, which are connected to one another and/or separated from one another in a particular pattern in the first switching position of the first main valve 12 shown in FIG. 1 in a first working configuration of the first main valve 12 in a first working configuration and in the second switching position of the first main valve 12 shown in FIG. 2.

Similarly, the second working valve section 26 has a plurality of second working connections 28, which are connected to one another and/or separated from one another in a predetermined pattern in the first switching position of the second main valve 13 shown in FIG. 1 in a first working configuration of the second main valve 13 and in the second switching position of the second main valve 13 shown in FIG. 2.

No fluid can pass between disconnected working connections 27 or 28, while a fluid flow of the drive pressure medium can take place between interconnected working connections 27 or 28.

In the exemplary embodiment shown, the first working valve section 25 has a total of four first working connections 27 and the second working valve section 26 has a total of four second working connections 28.

Each main valve 12, 13 has a main valve housing 31 and a valve slide 32 that can be moved in this respect according to the dot-dashed framed representation in FIG. 1. The first and second working connections 27, 28 are designed on the main valve housing 31. The switching movement 17 is carried out by the valve slide 32, which is charged by the spring device 14. The valve slide 32 has the drive surface 33, already mentioned, that can be supplied with the pilot fluid controlled by means of the assigned pilot valve 15, 16 for initiating the switching movement 17 or relieved by means of pressure. The first and second working configurations are determined by the design of the valve slide 32. For this purpose, it has a correspondingly designed working valve slide section 32a, which is a longitudinal section of the valve slide 32.

Two of the first working connections 27 in each case form a first working connection 27a and two of the second working connections 28 in each case form a second working connection 28a. Depending on the configuration of the working valve sections 25, 26, the number of the first and second connecting working connections 27a, 28a may also differ. The first and second connecting working connections 27a, 28a are continuously connected to one another by means of a working connection channel system 34 belonging to the valve arrangement 1 in an application-specific sample. Preferably, each first connecting working connection 27a is connected via a separate working connection channel 35 of the working connection channel system 34 to one of the second connecting working connections 28a in continuous fluid connection. For example, the working connection channel system 34 thus has two separate working connection channels 35, which connect the first and second connecting working connections 27a, 28a to one another in pairs.

Two further of the first working connections 27 are in each case an output working connection 27b, wherein each output working connection 27b is connected to a further fluid channel with one of the two drive chambers 2a, 2b of the fluid-operated actuator 2. The further fluid channels are, for example, realised by means of fluid lines.

Two further second working connections 28 act as input working connections 28b, wherein each working connection 28b is connected to one of the two control valve outputs 6 via a further fluid channel Here too, the further fluid channels can, for example, be realised by means of fluid lines. The number of output working connections 27b and input working connections 28b may also vary depending on the desired working function.

The first working valve section 25 is preferably designed such that in the first switching position of the first main valve 12 the two output working connections 27b are separated from the first connecting working connections 27a and also from one another (first working configuration), while in the second switching position of the first main valve 12 the two output working connections 27b are connected to one of the two first connecting working connections 27a in each case (second working configuration). The second working valve section 26 is preferably equipped with a comparable function and is, for example, designed such that the two input working connections 28b are separated from one another in the first switching position of the second main valve 13 from the two second connecting working connections 28a and also from one another (first working configuration), while in the second switching position of the second main valve 13 they are each connected to one of the two connecting working connections 28a (second working configuration). The fluidic connection and disconnection and thus the setting of the respective working configuration is caused by the working slide valve section 32a changing its position relative to the main valve housing 31.

In the first correct operating state or idle state, the two main valves 12, 13 assume the first switching position such that both working valve sections 25, 26 define the first working configuration and the fluid connection between the control valve device 5 and the actuator 2 is interrupted twice, namely both by the first main valve 12 and by the second main valve 13. In the second correct operating state, both main valves 12, 13 assume the second switching position such that both working valve sections 25, 26 define the second working configuration and the fluid connection between the control valve device 5 and the actuator 2 is continuously open. By way of example, there are two open fluid channel lines which each extend between one of the two control valve outputs 6 and one of the two drive chambers 2a, 2b.

A safety function of the valve arrangement 1 is justified in that the valve arrangement 1 interrupts the fluid connection between the control valve device 5 and the actuator 2 not only in the first correct operating state, but also in further operating states designated below as a faulty operating state in each case, in which the switching positions of the two main valves 12, 13 are opposite one another, i.e. one of the two main valves 12, 13 takes on the first switching position and at the same time the other of the two main valves 13, 12 takes on the second switching position.

Figure 3:
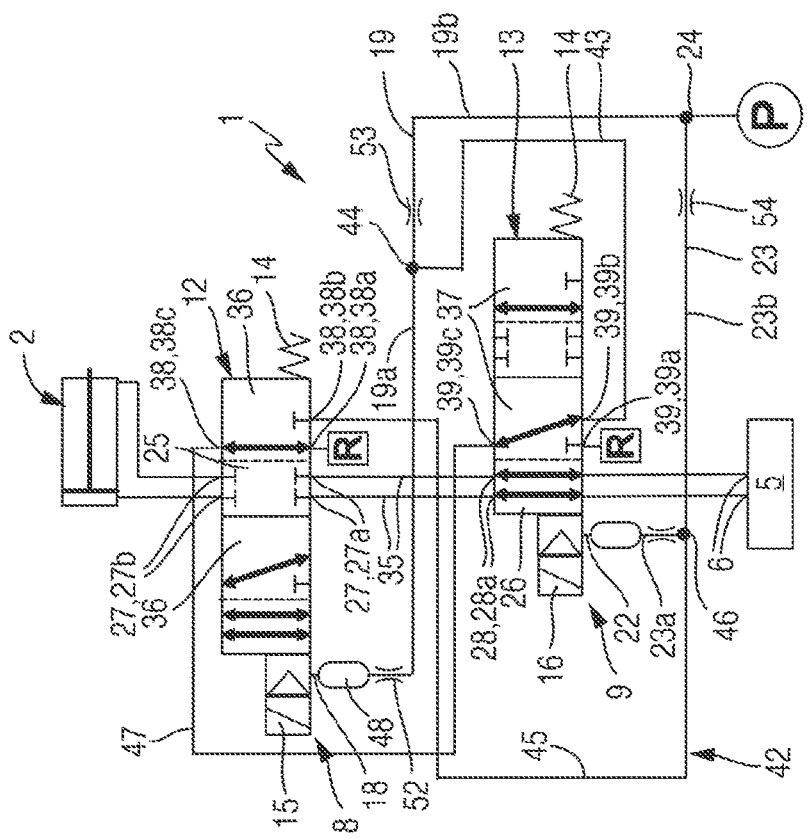

FIGS. 3 and 4 show two examples of such faulty operating states. In the first faulty operating state according to FIG. 3, the first main valve 12 is in the first switching position, while the second main valve 13 simultaneously takes on the second switching position. In the second faulty operating state shown in FIG. 4, the switching positions are interchanged, i.e. here the first main valve 12 assumes the second switching position, while the second main valve 13 simultaneously assumes the first switching position. In both cases, the fluid connection between the control valve device 5 and the fluid-actuated actuator 2 is interrupted by one of the two main valves 12, 13, namely by the main valve 12 or 13 adopting the first switching position.

A special feature of the valve arrangement 1 is that each main valve 12, 13 has, in addition to its working valve section 25, 26, a further valve section designated as monitoring valve section, which in the case of the first main valve 12 is designated as the first monitoring valve section and in the case of the second main valve 13 is designated as the second monitoring valve section. The first monitoring valve section 36 is as fluidically separated from the first working valve section 25 as the second monitoring valve section 37 is fluidically separated from the second working valve section 26.

The first monitoring valve section 36 has a plurality of first monitoring connections 38, while the second monitoring valve section 37 has a plurality of second monitoring connections 39. Preferably, three of each of the first and second monitoring connections 38, 39 are provided, which applies to the embodiment shown. In this context, it is advantageous if the two monitoring valve sections 36, 37 each have a 3/2 valve function, as is the case in the exemplary embodiment shown.

The first monitoring valve section 36 is designed such that the first monitoring connections 38 are connected to one another and/or disconnected from one another in the first switching position of the first main valve 12 in a first monitoring configuration and in the second switching position of the first main valve 12 in a second monitoring configuration deviating from the first monitoring configuration. Similarly, the second monitoring valve section 37 is designed such that the second monitoring connections 39 are connected to one another and/or disconnected from one another in the first switching position of the second main valve 13 in a first monitoring configuration and in the second switching position of the second main valve 13 in a second monitoring configuration deviating from the first monitoring configuration. It is essential that when switching each main valve 12, 13, a change always takes place synchronously in the working configuration and in the monitoring configuration.

The first and second monitoring connections 38, 39 are expediently designed on the main valve housing 31 of the assigned main valve 12, 13. The valve slide 32, which in addition to the working valve slide section 32a also has a monitoring valve slide section 32b, which participates in the switching movement 17 and influences the connection pattern within the first and second monitoring connections 38, 39 depending on the switching position, is responsible for changing the monitoring configuration.

During the switching movement 17 of the valve slide 32, the working valve slide section 32a and the monitoring valve slide section 32b mechanically coupled in this regard always move synchronously. The mechanical coupling is, for example, realised in that the two valve slide sections 32a, 32b are connected to one another in a single piece. Alternatively, they can, for example, also be designed as separate valve slide sections fixed to one another by suitable fastening measures.

Among the first monitoring connections 38 there is a first venting monitoring connection 38a, while among the second monitoring connections 39 there is a second venting monitoring connection 39a. Both venting monitoring connections 38a, 39a are permanently connected to a pressure sink R, which is preferably the atmosphere, so that they can be used for venting purposes. The connection to the atmosphere can be realised by means of a silencer.

Expediently, among the first monitoring connections 38 there are also a first feed monitoring connection 38b and a first connection monitoring connection 38c. Similarly, the second monitoring connections 39 expediently comprise a second feed monitoring connection 39b and a second connection monitoring connection 39c in addition to the second feed monitoring connection 39a.

The two feed monitoring connections 38b, 39b and the two connection monitoring connections 38c, 39c are connected to a monitoring channel system 42 of the valve arrangement 1, to which, among other things, the first pilot channel 19 and the second pilot channel 23 also belong.

Expediently, the second feed monitoring connection 39b of the second monitoring valve section 37 is permanently connected to the first pilot channel 19, which preferably takes place via a first branch channel 43 of the monitoring channel system 42, which is to connected to the first pilot channel 19 at a first branch 44. The first branch 44 is located in the first input control channel 19 between the input control feed connection 24 and the first input control connection 18.

The monitoring channel system 42 preferably has a second branch channel 45, which establishes a continuous fluid connection between the first feed monitoring connection 38b of the first monitoring valve section 36 and the second pilot channel 23. The connection of the second branch channel 45 to the second pilot channel 23 takes place at a second branch 46, which is located between the pilot feed connection 24 and the second pilot connection 22.

The monitoring channel system 42 expediently also contains a monitoring connection channel 47, which establishes a continuous fluid connection between the first connection monitoring connection 38c of the first main valve 12 and the second connection monitoring connection 39c of the second main valve 13.

Each main valve 12, 13 is configured so that the first working configuration always accompanies the first monitoring configuration and the second working configuration always accompanies the second monitoring configuration. In other words, the two monitoring valve sections 36, 37 define a first monitoring configuration in the first switching position of the assigned main valve 12, 13 shown in FIG. 1 and a second monitoring configuration in the second switching position of the main valve 12, 13 shown in FIG. 2.

Internally, the first and second monitoring valve section 36, 37 are designed such that in the respective first monitoring configuration a fluid connection is established between the respective first or second connection monitoring connection 38c, 39c and the first or second venting monitoring connection 38a, 39a, while in the second monitoring configuration a fluid connection is established between the respective first or second connection monitoring connection 38c, 39c and the assigned first or second feed monitoring connection 38b, 39b. At the same time, in the respective first monitoring configuration, the first feed monitoring connection 38b and the second feed monitoring connection 39b are disconnected from the other monitoring connections of the same main valve 12, 13, while in the second monitoring configuration each feed monitoring connection 38a, 39a is disconnected from the other monitoring connections 38b, 38c, 39b, 39c of the same main valve 12, 13.

With this connection, it is achieved that the first pilot control connection 18 and/or the second pilot control connection 19 is connected through the monitoring channel system 42 to the first venting monitoring connection 38a and/or to the second venting monitoring connection 39a and is thus vented if one of the two main valves 12, 13 takes on the first switching position and the other simultaneously takes on its second switching position. If both main valves 12, 13 are in the first switching position or in the second switching position, each pilot connection 18, 19 is disconnected from both venting monitoring connections such that the pilot pressure specified by the pilot pressure source P is present via the assigned pilot channel 19, 23.

Consequences of this connection are obvious from the faulty operating states shown in FIGS. 3 and 4.

The first faulty operating state shown in FIG. 3 results from the fact that, starting from the first correct operating state of FIG. 1, only the second main valve 13 switches to the second switching position, while the first main valve 12 remains in the first switching position. As a result, the first pilot connection 18 is connected to the atmosphere via the inner channel section 19a of the first pilot channel 19 adjoining it up to the first branch 44, the first branch channel 43, the second monitoring valve section 37 located in the second monitoring configuration, the monitoring connection channel 47 and the first monitoring valve section 36 remaining in the second monitoring configuration and is thus vented. This prevents a subsequent switching of the first main valve 12 into the second switching position.

The second faulty operating state according to FIG. 4 results from the fact that, starting from the first switching position, only the first main valve 12 has switched to the second switching position, while the second main valve 13 remains in the first switching position. In this case, the second pilot connection 22 is connected and consequently vented to the second venting monitoring connection 39a via an inner channel section 23a of the second pilot channel 23 connecting thereto up to the second branch 46, the second branch channel 45, the first monitoring valve section 36 having the second monitoring configuration, the monitoring connection channel 47 and the second monitoring valve section 37 remaining in the first monitoring configuration. Subsequent switching of the second main valve 13 into the second switching position is therefore excluded due to a lack of pilot pressure.

The two faulty operating states of FIGS. 3 and 4 can also result from the fact that the two main valves 12, 13 are to be switched back to the first switching position starting from the second switching position adopted jointly, wherein only one of the main valves 12, 13 actually switches back.

Fault detection can, for example, take place via a runtime measurement of the output part 3 normally executing the output movement 4.

Preferably, in the course of each of the two pilot channels 19, 23, a separate fluid reservoir 48 is arranged, which is filled in the correct operating states of FIGS. 1 and 2 through the assigned pilot channel 19, 23 with pilot medium under the pilot pressure. Preferably, a fluid reservoir 48 is arranged in the inner channel section 19a of the first pilot channel 19 and a further fluid reservoir 48 is arranged in the inner channel section 23a of the second pilot channel 23. Expediently, each fluid reservoir 48 is located in the immediate vicinity of the assigned pilot connection 18, 22.

Each fluid reservoir 48 is expediently connected upstream of the pilot pressure source P to a throttle point, which is designated as a delay throttle point 52 for better differentiation. Preferably, each delay throttle point 52 is located in one of the two inner channel sections 19a, 23a and in particular between the fluid reservoir 48 and the assigned first or second branch 44, 46.

Each fluid reservoir 48, in particular in combination with the upstream delay throttle point 52, ensures that the assigned first or second pilot control connection 18, 22 is vented with a time delay if it is connected to one of the vent monitoring connections 38a, 39a due to deviating switching positions of the main valves 12, 13. In this way, the system receives a certain fault tolerance, which prevents the valve arrangement 1 from switching into a faulty operating state if the two main valves 12, 13 do not switch over exactly synchronously due to the tolerance, but with a certain time delay, which can be up to 20 milliseconds, for example. The fault tolerance measures ensure that the pilot pressure at the pilot connections 18, 22 remains for a certain period of time in the event of a time-delayed switching of the main valves 12, 13, so that both main valves 12, 13 can be switched over with a short time delay.

A first input throttle point 53 is expediently arranged in an outer channel section 19b of the first pilot channel 19 extending between the pilot feed connection 24 and the first branch 44. A second input throttle point 54 is expediently located in an outer channel section 23b of the second pilot channel 23, which extends between the pilot feed connection 24 and the second branch 46. The input throttle points 53, 54 reduce air consumption in those operating states in which one of the inner channel sections 19a, 23a is vented during a faulty operating state. Nevertheless, the input throttle points 53, 54 guarantee the feed of the pilot pressure at the two pilot connections 18, 22 in fault-free operation.

Preferably, each input throttle point 53, 54 has a greater flow resistance than the channel line of the monitoring channel system 42, which is vented via the first venting monitoring connection 38a and/or the second venting monitoring connection 39a in the event of a faulty operating state. This ensures that the flow of pilot medium into the inner channel sections 19a, 23a is lower than the outflow rate in the vented state with the consequence that the venting function is not impaired.

The flow resistance of each delay throttle point 52 is preferably lower than the flow resistance of each input throttle point 53, 54.

Preferably, the two main valves 12, 13 are designed such that they pass through an intermediate position shown in FIG. 5 when switching between the first switching position and the second switching position, in which both the first monitoring connections 38 and the second monitoring connections 39 assume an intermediate configuration deviating from both the first monitoring configuration and the second monitoring configuration. In this intermediate configuration, all first monitoring connections 38 within the first monitoring valve section 36 and all second monitoring connections 39 within the second monitoring valve section 37 are fluidically connected to one another. There is therefore a short-circuit connection between all monitoring connections 38, 39 of each monitoring valve section 36, 37. This can also be referred to as a negative overlap when switching between the two switching positions. The intermediate position is expediently a centre position between the two switching positions of the respective main valve 12, 13.

The configuration in which the first and second working connections 27, 28 are connected to one another or separated from one another in this intermediate position or centre position depends on the desired working function of the working valve sections 25, 26. However, it is advantageous if, according to the exemplary embodiment shown, for each main valve 12, 13 the working valve section 25, 26 and the monitoring valve section 36, 37 are matched to one another such that in the intermediate position in each case the first working configuration of the first and second working connections 27, 28 is provided.

The intermediate configuration occurring when switching the main valves 12, 13 offers increased safety in the case of further faulty operating states, which are shown in FIGS. 5 to 9.

FIG. 5 shows a third faulty operating state in which the two main valves 12, 13 are moved out of the first switching position, but have stopped in the intermediate position or central position in each case. For example, this movement stop is due to the pilot media failing or mechanical blocking. The intermediate configuration of the monitoring valve sections 36, 37 provided here means that both pilot connections 18, 22 are vented. The venting of the first pilot control connection 18 takes place via the inner channel section 19a of the first pilot control channel 19, the first branch channel 43 and the second monitoring valve section 37 located in the intermediate configuration to the second venting monitoring connection 39a. However, a double venting even takes place here since the second connecting monitoring connection 39c is connected to the first venting monitoring connection 38a via the monitoring connection channel 47 and the first monitoring valve section 36, which also takes over the intermediate configuration. Double venting is also provided on the side of the second pilot control connection 22, since it is, on the one hand, connected to the first venting monitoring connection 38a via the second branch channel 45 and the first monitoring valve section 36 and, on the other hand, the first monitoring connection 38c connected to the first feed monitoring connection 38b due to the intermediate configuration is connected to the second monitoring connection 39a via the monitoring connection channel 47 and the second monitoring valve section 37.

Since the pilot pressure is thus removed in both pilot valves 15, 16, the spring devices 14 can switch both main valves 12, 13 back into their first switching position so that the safe idle state shown in FIG. 1 is achieved.

Figure 6:
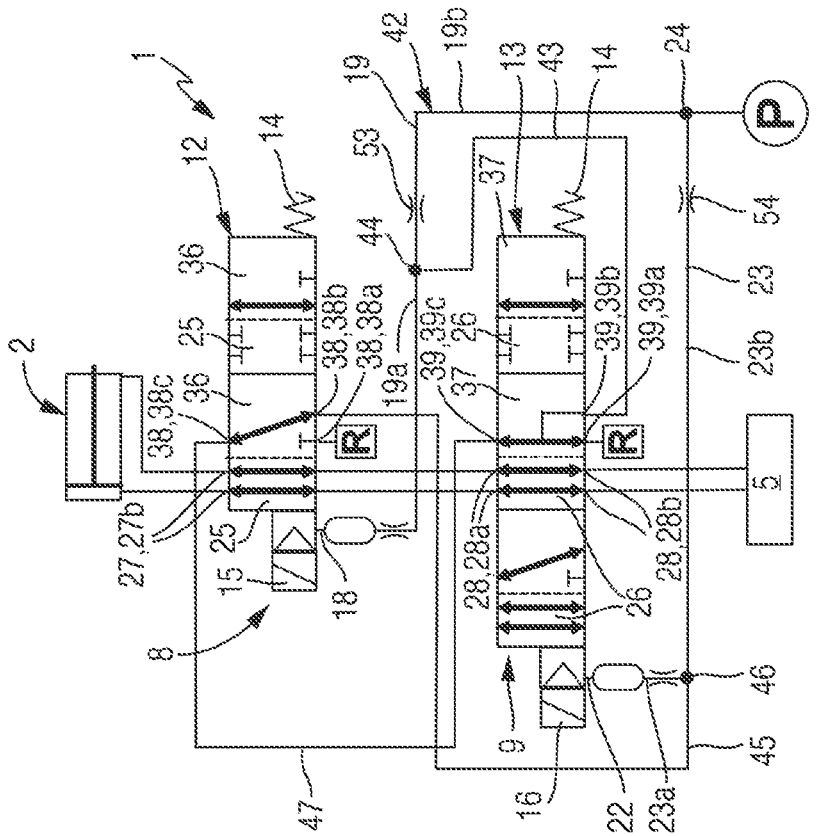

FIG. 6 shows a fourth faulty operating state in which, when switching the two main valves 12, 13 from the first switching positions, only the second main valve 13 has correctly switched to the second switching position, while the first main valve 12 has stuck in the intermediate position. In this configuration, the second pilot control connection 22 is connected to the first venting monitoring connection 38a via the inner channel section 23a of the second pilot control channel 23, the second branch channel 45 and the first monitoring valve section 36 defining an intermediate configuration and is thus vented. As a result, the second main valve 13 immediately switches back to the first switching position by the spring force of the assigned spring device 14 such that the second working valve section 26 interrupts the fluid connection between the control valve device 5 and the actuator 2.

Figure 7:
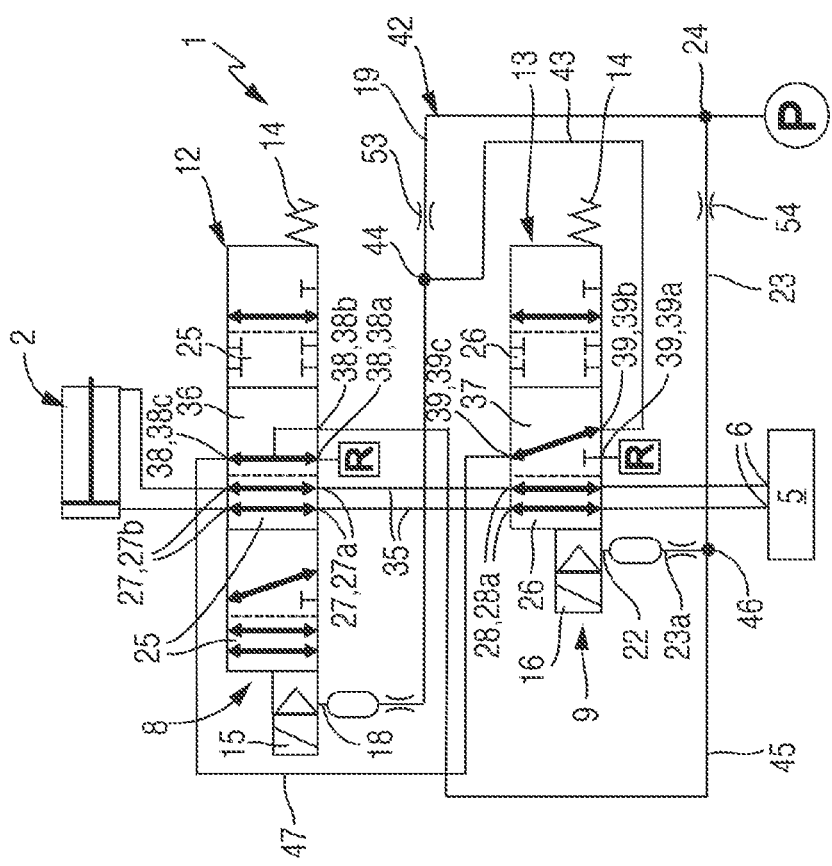

The fifth faulty operating state shown in FIG. 7 is comparable to the fourth faulty operating state illustrated in FIG. 6, with the only difference being that the first main valve 12 has correctly switched to the second switching position here, while the second main valve 13 has stuck in the intermediate position or centre position when switching to the second switching position. In this configuration, the first pilot control connection 18 is connected to the second venting monitoring connection 39a via the inner channel section 19a of the first pilot control channel 19, the first branch channel 43 and the second monitoring valve section 37 defining the intermediate configuration and is consequently vented. As a result, the first main valve 12 immediately switches back to the first switching position due to the spring force of the assigned spring device 14, so that the first working valve section 25 prescribes the second working configuration and interrupts the fluid connection between the control valve device 5 and the actuator 2.

Figure 8:
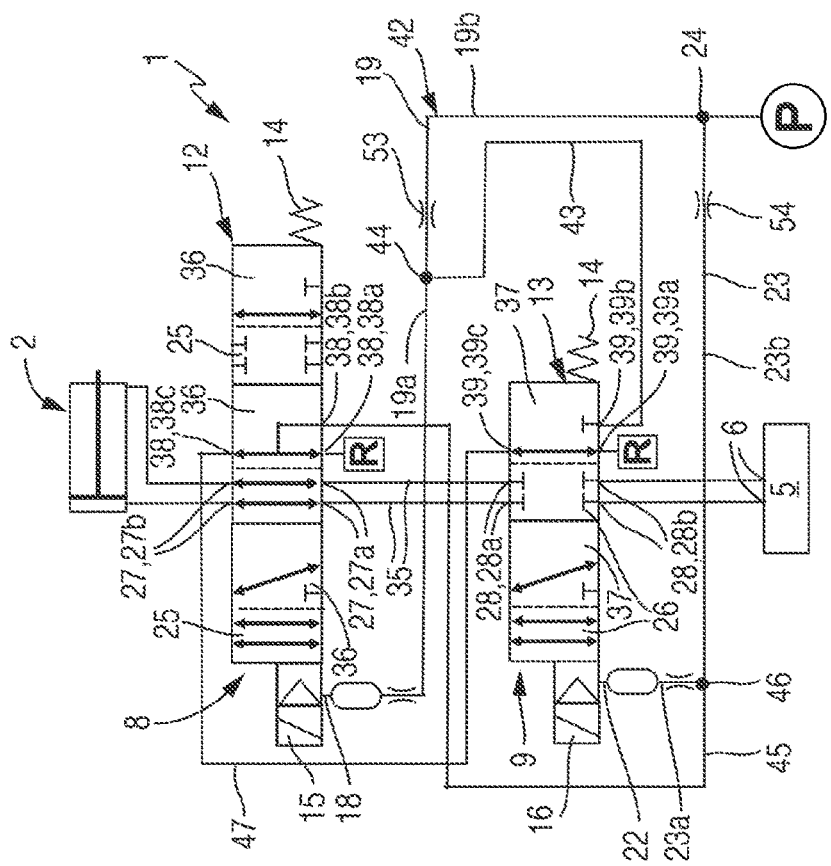

FIG. 8 shows a sixth faulty operating state, which has occurred from the common second switching position when the main valves 12, 13 were switched back. Switching back to the first switching position is in each case caused by the control device 7 in that the two pilot valves 15, 16 are deactivated and thus vented. Thus, in both main valves 12, 13 the spring device 14 is effective in a pushing-back manner. However, due to a fault, only the second main valve 13 is switched back to the first switching position, while the first main valve 12 has stuck in the intermediate position or central position. In this case, the fluid connection between the control valve device 5 and the actuator 2 is interrupted due to the first working configuration of the second working valve section 26. This operating state is ensured by the fact that the second main valve 13 can no longer switch to the second switching position even if the second pilot valve 16 is activated, in which the fluid connection between the control valve device 5 and the actuator 2 would be open. This switching is prevented by the second pilot control connection 22 being connected to the first venting monitoring connection 38a via the inner channel section 23a of the second pilot control channel 23, the second branch channel 45 and the first monitoring valve section 36 of the first main valve 12 defining the intermediate configuration and is thus depressurised.

Figure 9:
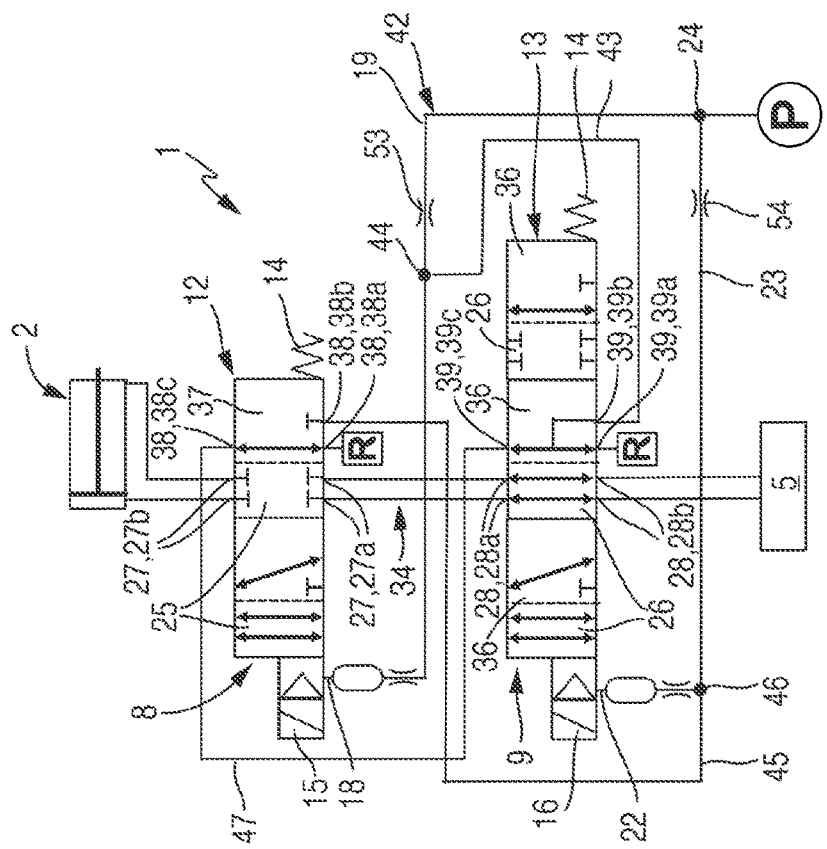

FIG. 9 shows a seventh faulty operating state, which differs from the sixth faulty operating state of FIG. 8 in that, starting from the second switching position adopted in each case, only the first main valve 12 was correctly switched back into the first switching position, while the second main valve 13 has stuck in the intermediate position or middle position. In this configuration, the first pilot control connection 18 is connected to the second venting monitoring connection 39a via the inner channel section 19a of the first pilot control channel 19, the first branch channel 43 and the second monitoring valve section 37 predetermining the intermediate configuration and is consequently depressurised. Thus, even if the assigned first pilot valve 15 is activated, the first main valve 12 can no longer switch to the second switching position in the absence of sufficient pilot pressure. Thus, the fluid connection between the control valve device 5 and the actuator 2 remains interrupted by the first working valve section 25 predetermining the first working configuration.

What is claimed is:

1. A valve arrangement comprising:
a first valve unit having a monostable first main valve preloaded by a first spring device with a first spring force into a first main valve first switching position and further having an electrically actuatable first pilot valve for switching the first main valve into a first main valve second switching position by means of a first pilot pressure against the first spring force and can be held in the first main valve second switching position, wherein the first pilot pressure is provided by a first pilot fluid that comes from a first pilot pressure source connected to a first pilot connection of the first pilot valve via a first pilot channel during operation of the valve arrangement; and
a second valve unit having a monostable second main valve preloaded by a second spring device with a second spring force into a second main valve first switching position and further having an electrically actuatable second pilot valve for switching the second main valve into a second main valve second switching position by means of a second pilot pressure against the second spring force and can be held in the second main valve second switching position, wherein the second pilot pressure is provided by a second pilot fluid that comes from a second pilot pressure source connected to a second pilot connection of the second pilot valve via a second pilot channel during operation of the valve arrangement,
wherein the first main valve has a first working valve section having a plurality of first working connections connected to one another and/or disconnected from one another in the first switching position of the first main valve in a first working configuration and in the second switching position of the first main valve in a second working configuration within the first main valve and wherein the second main valve has a second working valve section having a plurality of second working connections connected to one another and/or disconnected from one another in the first switching position of the second main valve in a first working configuration and in the second switching position of the second main valve in a second working configuration within the second main valve, wherein at least one of the first working connections and at least one of the second working connections are designed as connecting working connections, the connecting working connections being permanently connected to one another via a working connection channel system, and
wherein at least one of the first or second working connections is an output working connection suitable for connecting a fluid-operated actuator, and wherein the first main valve has a first monitoring valve section with a plurality of first monitoring connections always connected to one another and/or separated from one another in a first monitoring configuration in the first switching position of the first main valve and are always connected to one another and/or separated from one another in a second monitoring configuration that differs from the first monitoring configuration in the second switching position of the first main valve, and
wherein the second main valve has a second monitoring valve section with a plurality of second monitoring connections always connected to one another and/or separated from one another in a first monitoring configuration in the first switching position of the second main valve and are always connected to one another and/or separated from one another in a second monitoring configuration that differs from the first monitoring configuration in the second switching position of the second main valve, and
wherein one of the first monitoring connections of the first monitoring valve section is designed as a first venting monitoring connection and one of the second monitoring connections of the second monitoring valve section is designed as a second venting monitoring connection, wherein each further first monitoring connection and each further second monitoring connection are connected to a monitoring channel system, and
wherein the first pilot connection and/or the second pilot connection is connected via the monitoring channel system to the first venting monitoring connection and/or the second venting monitoring connection and is thus vented if one of the two main valves assumes its first switching position and the other of the two main valves simultaneously assumes its second switching position, and
wherein the first monitoring valve section is fluidically separated from the first working valve section, and
wherein the second monitoring valve section is fluidically separated from the second working valve section, and
wherein the first venting monitoring connection is permanently communicating with a pressure sink, and
wherein the second venting monitoring connection is permanently communicating with the pressure sink, and
wherein the monitoring channel systems contains both the first pilot channel and the second pilot channel.

2. The valve arrangement according to claim 1, wherein a fluid reservoir is arranged both in the first pilot channel and in the second pilot channel upstream of the respectively assigned pilot connection.

3. The valve arrangement according to claim 2, wherein both in the first pilot channel and in the second pilot channel on the side of the fluid reservoir opposite the assigned pilot connection, a delay throttle point is arranged that causes a delayed fluid outflow when the pilot connection is vented.

4. The valve arrangement according to claim 1, wherein the two monitoring valve sections each have a 3/2 valve function.

5. The valve arrangement according to claim 4, wherein the first monitoring valve section comprises three first monitoring connections and the second monitoring valve section comprises three second monitoring connections, wherein the first monitoring valve section comprises, apart from the first venting monitoring connection, a first feed monitoring connection and a first connection monitoring connection, and wherein the second monitoring valve section, apart from the second venting monitoring connection, comprises a second feed monitoring connection and a second connection monitoring connection, wherein the first feed monitoring connection is connected to the second pilot channel and the second feed monitoring connection is connected to the first pilot channel and wherein the first connection monitoring connection is connected to the second connection monitoring connection via a monitoring connection channel of the monitoring channel system.

6. The valve arrangement according to claim 5, wherein the first monitoring valve section and the second monitoring valve section are designed such that the first monitoring valve section belonging to the first main valve establishes a first fluid connection between the first connection monitoring connection and the first venting monitoring connection in the first monitoring configuration and a second fluid connection between the first connection monitoring connection and the first feed monitoring connection in the second monitoring configuration, wherein the second monitoring valve section belonging to the second main valve establishes a third fluid connection between the second connection monitoring connection and the second venting monitoring connection in the first monitoring configuration and a fourth fluid connection between the second connection monitoring connection and the second feed monitoring connection in the second monitoring configuration.

7. The valve arrangement according to claim 5, wherein the second feed monitoring connection is connected to the first pilot channel via a first branch channel of the monitoring channel system at a first branch, wherein the first feed monitoring connection is connected to the second pilot channel via a second branch channel of the monitoring channel system at a second branch.

8. The valve arrangement according to claim 7, wherein the monitoring channel system has a pilot feed connection connected to the pilot pressure source during operation of the valve arrangement, the pilot feed connection being further connected to the first pilot channel and the second pilot channel, wherein in the course of the first pilot channel a first input throttle point is arranged between the pilot pressure source and the first branch and in the course of the second pilot channel a second input throttle point is arranged between the pilot pressure source and the second branch.

9. The valve arrangement according to claim 8, wherein each input throttle point has a greater flow resistance than a channel line vented via a first vent monitoring connection and/or a second vent monitoring connection, wherein the channel line includes the branch channel connecting at the assigned branch.

10. The valve arrangement according to claim 8, wherein both in the first pilot channel and in the second pilot channel on the side of the fluid reservoir opposite the assigned pilot connection, a delay throttle point is arranged that causes a delayed fluid outflow when the pilot connection is vented, wherein the flow resistances of the delay throttle points are less than the flow resistances of the input throttle points.

11. The valve arrangement according to claim 1, wherein the first main valve passes through an intermediate position during the switching between the first and the second switching position, wherein the first monitoring connections assume an intermediate configuration in the intermediate position, the intermediate configuration deviating from the first monitoring configuration and the second monitoring configuration, wherein all first monitoring connections are fluidically connected to one another within the first monitoring valve section in the intermediate configuration.

12. The valve arrangement according to claim 1, wherein the second main valve passes through an intermediate position during the switching between the first and the second switching position, wherein the second monitoring connections assume an intermediate configuration in the intermediate position, the intermediate configuration deviating from the first monitoring configuration and the second monitoring configuration, wherein all second monitoring connections are fluidically connected to one another within the second monitoring valve section in the intermediate configuration.

13. The valve arrangement according to claim 11, wherein the working valve section and the monitoring valve section of the main valve are matched to one another such that in the intermediate position the first working configuration of the working connections is present.

14. The valve arrangement according to claim 1, wherein each main valve has a valve slide that can only be moved uniformly synchronously relative to a main valve housing whereby both the working configurations and the monitoring configurations can be predefined simultaneously.

15. The valve arrangement according to claim 14, wherein each valve slide has a working valve slide section belonging to the working valve section and serving to specify the working configurations and a monitoring valve slide section belonging to the monitoring valve section and serving to specify the monitoring configurations.

16. The valve arrangement according to claim 1, wherein the first working valve section belonging to the first main valve has at least one or a plurality of working connections designed as output working connections for connecting the o;' fluid-operated actuator, while the second working valve section belonging to the second main valve has at least one or a plurality of working connections designed as input working connections for connecting a control valve device controlling the operation of the actuator.

17. The valve arrangement according to claim 16, wherein the first working valve section has four first working connections and the second working valve section has four second working connections, wherein two first working connections are designed as two output working connections and two second working connections are designed as two input working connections and wherein two further first working connections are designed as two first connecting working connections and two further second working connections are designed as two second connecting working connections, wherein each first connecting working connection is connected via a separate working connection channel of the working connection channel system to one of the two connecting working connections, wherein the two output working connections are each connected to one of the two first connection working connections in the second switching position of the first main valve and are disconnected from the two first connection working connections in the first switching position of the first main valve and wherein the two input working connections are each connected to one of the two second connecting working connections in the second switching position of the second main valve and are disconnected from the two second connecting working connections in the first switching position of the first main valve.

* * * * *